(12) United States Patent
Patoux et al.

(10) Patent No.: US 7,754,384 B2
(45) Date of Patent: Jul. 13, 2010

(54) HIGH-VOLTAGE POSITIVE ELECTRODE MATERIAL HAVING A SPINEL STRUCTURE BASED ON NICKEL AND MANGANESE FOR LITHIUM CELL BATTERIES

(75) Inventors: Sébastien Patoux, Fontaine (FR); Frédéric Le Cras, Notre Dame de l'Osier (FR); Carole Bourbon, Saint Michel de Saint Geoirs (FR); Séverine Jouanneau, Fontaine (FR)

(73) Assignee: Commissariat A l'Energie Atomique, Paris (FR)

( * ) Notice: Subject to any disclaimer, the term of this patent is extended or adjusted under 35 U.S.C. 154(b) by 0 days.

(21) Appl. No.: 11/972,263

(22) Filed: Jan. 10, 2008

(65) Prior Publication Data

US 2008/0107968 A1 May 8, 2008

Related U.S. Application Data

(63) Continuation of application No. PCT/FR2006/050686, filed on Jul. 7, 2006.

(30) Foreign Application Priority Data

Aug. 25, 2005 (FR) .................................. 05 08737

(51) Int. Cl.
*H01M 4/02* (2006.01)
*H01M 4/50* (2006.01)
*C01G 45/12* (2006.01)
*C01D 1/02* (2006.01)

(52) U.S. Cl. .................... 429/223; 429/231.1; 429/224; 423/599; 423/594.4

(58) Field of Classification Search ................... 429/224
See application file for complete search history.

(56) References Cited

U.S. PATENT DOCUMENTS 5,631,104 A 5/1997 Zhong et al.
5,759,717 A 6/1998 Amine et al.

(Continued)

FOREIGN PATENT DOCUMENTS

EP 1 093 172 A1 4/2001

(Continued)

OTHER PUBLICATIONS

Wei et al., Effect of Ni Doping on [MnO6] Octahedron in LiMn2O4, Nov. 4, 2004, J. Phys. Chem. B 2004, 108, 18547-18551.*

(Continued)

*Primary Examiner*—Dah-Wei D Yuan
*Assistant Examiner*—Kwang Han
(74) *Attorney, Agent, or Firm*—Oliff & Berridge, PLC

(57) ABSTRACT

A spinel structure compound of the formula $LiNi_{0.4}Mn_{1.6}O_{4-\delta}$, wherein $\delta>0$, has a lattice parameter of from 8.179 to 8.183 Å. The compound may be prepared by mixing carbonated precursors under stoichiometric conditions to produce a mixture, subjecting the mixture to a first heat treatment at a temperature of from 500 to 700° C., and then subjecting the mixture to one or more annealing treatments at a temperature of from 700 to 950° C., followed by cooling in a medium containing oxygen. The spinel structure compound may be used as an electrochemically active material in an electrode, for example an electrode of a battery.

18 Claims, 3 Drawing Sheets

U.S. PATENT DOCUMENTS

| | | | | |
|---|---|---|---|---|
| 5,783,332 | A | * | 7/1998 | Amine et al. ............... 429/221 |
| 5,824,285 | A | * | 10/1998 | Koksbang ................... 423/599 |
| 6,337,158 | B1 | * | 1/2002 | Nakajima et al. ........... 429/224 |
| 2001/0008730 | A1 | | 7/2001 | Amine et al. |
| 2002/0192148 | A1 | | 12/2002 | Kweon et al. |
| 2004/0202938 | A1 | | 10/2004 | Noguchi et al. |

FOREIGN PATENT DOCUMENTS

| | | |
|---|---|---|
| FR | 2 738 673 A1 | 3/1997 |
| JP | 08-217452 A1 | 8/1996 |

OTHER PUBLICATIONS

J.H. Kim et al., *"Comparative Study of $LiNi_{0.5}Mn_{1.5}O_{4-\delta}$ and $LiNi_{0.5}Mn_{1.5}O_{\alpha}$ Cathodes Having Two Crystallographic Structures: $Fd3m$ and $P4_332$,"* Chemistry of Materials, American Chemical Society, Washington, US, ISSN 0897-4756, XP002346119, vol. 16, pp. 906-914, Feb. 2004.

Y. Xia et al., *"A 4 V Lithium-Ion Battery Based on a 5 V $LiNi_xMn_{2-x}O_4$ Cathode and a Flake Cu-Sn Microcomposite Anode,"* Electrochemical and Solid-State Letters, IEEE Service Center, Piscataway, NJ, US—ISSN 1099-0062, XP001101382, vol. 4, No. 2, Feb. 2001, pp. A09-A11.

Q. Zhong et al., *"Synthesis and Electrochemistry of $LiNi_xMn_{2-x}O_4$,"* Journal of the Electrochemical Society, Electrochemical Society, Manchester, New Hampshire, US—ISSN 0013-4651, XP002969926, vol. 144, No. 1, Jan. 1997, pp. 205-213.

K. Takahashi, et al., *"Electrochemical and Structural Properties of a 4.7 V-Class $LiNi_{0.5}Mn_{1.5}O_4$ Positive Electrode Material Prepared with a Self-Reaction Method,"* Journal of the Electrochemical Society, The Electrochemical Society, ISSN 0013-4651, vol. 151, No. 1, 2001, pp. A173-A177.

\* cited by examiner

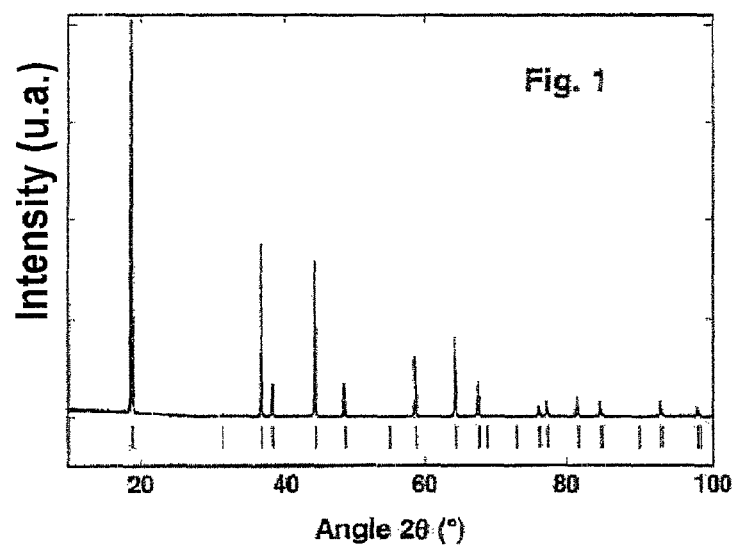
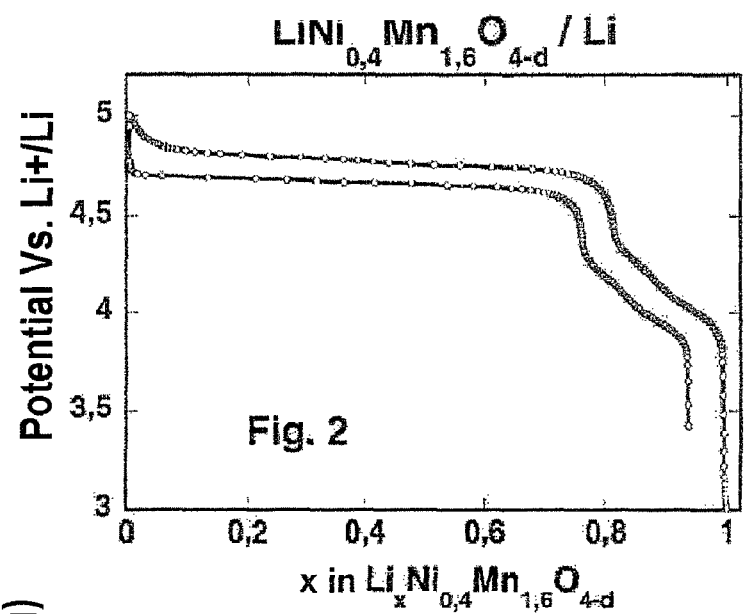
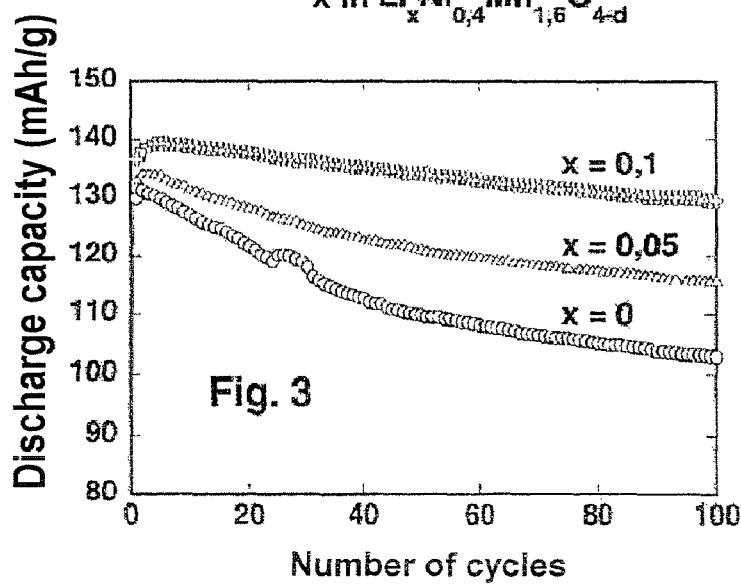

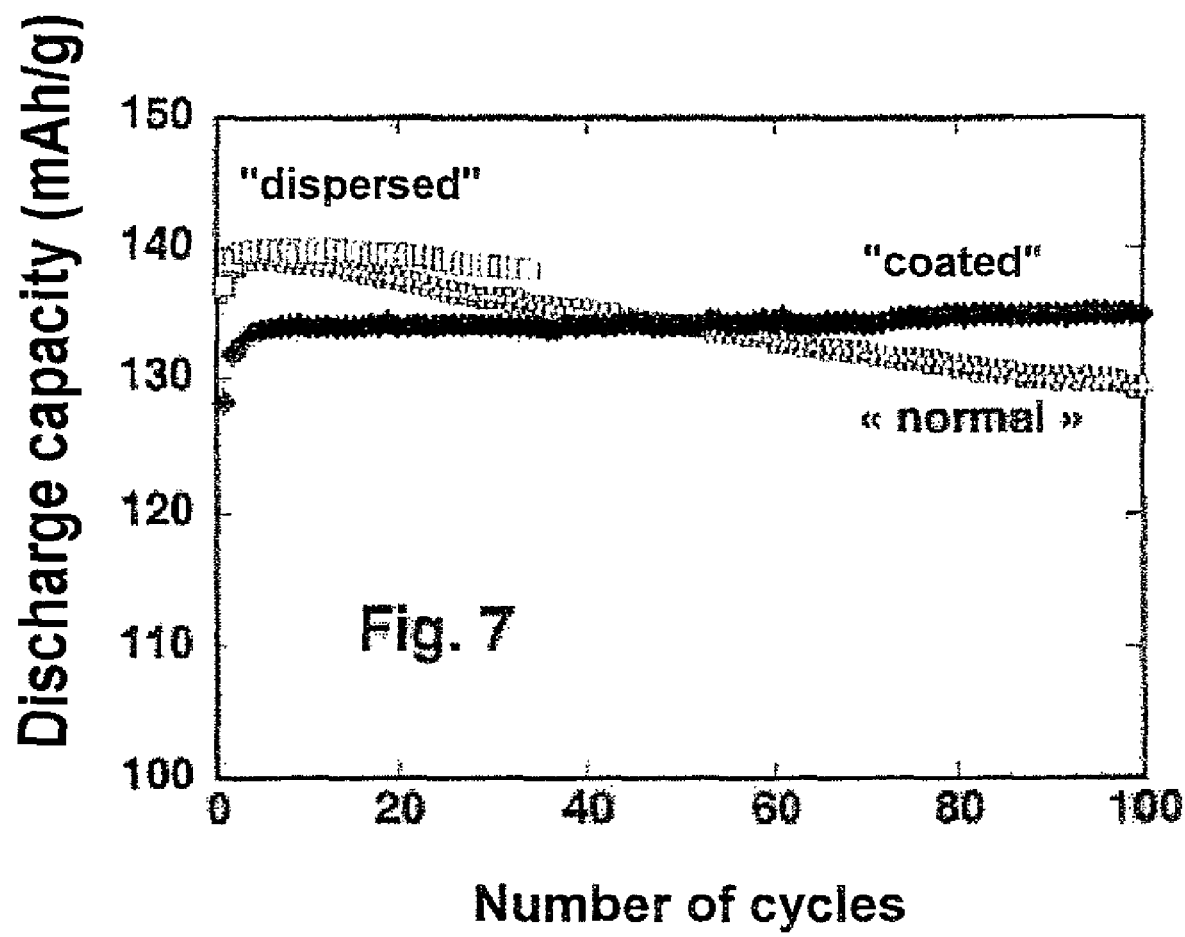

# HIGH-VOLTAGE POSITIVE ELECTRODE MATERIAL HAVING A SPINEL STRUCTURE BASED ON NICKEL AND MANGANESE FOR LITHIUM CELL BATTERIES

FIELD OF THE INVENTION

The present invention relates to a new spinel structure compound of the mixed oxide type based on Ni, Mn and Li having a clearly determined formula and lattice parameter.

Such a compound has remarkable properties in terms of stability and electrochemical performance.

Consequently, it is advantageously used in electrodes, batteries and lithium batteries.

DESCRIPTION OF THE PRIOR ART

Lithium batteries are increasingly being used as self-contained energy sources, especially in portable equipment where there are gradually replacing nickel-cadmium batteries (NiCd) and nickel-metal hydride batteries (NiMH). This change is explained by the continuous improvement in the performance of lithium batteries which gives them mass energy densities and volume energy densities which are substantially superior to those offered by NiCd and NiMH technologies.

The active electrode compounds used in commercial batteries, for the positive electrode, are lamellar compounds such as $LiCoO_2$, $LiNiO_2$ and mixed $Li(Ni, Co, Mn, Al)O_2$ compounds or spinel structure compounds with a composition similar to $LiMn_2O_4$. The negative electrode generally consists of carbon (graphite, coke etc.) or possibly spinel $Li_4Ti_5O_{12}$ or a metal which forms an alloy with lithium (Sn, Si, . . . ). The theoretical and practical capacities of the positive electrode compounds stated are respectively approximately 275 mAh/g and 140 mAh/g for lamellar oxides ($LiCoO_2$ and $LiNiO_2$), and 148 mAh/g and 120 mAh/g for spinel $LiMn_2O_4$. In every case, an operating voltage of around 4 V with respect to metal lithium is obtained. Similarly, olivine-structure lithium-iron phosphate $LiFePO_4$ (170 mAh/g at 3.4 V with respect to $Li^+/Li$; i.e. 580 Wh/kg) is often cited as a positive electrode material of choice for certain applications (hybrid cars, etc.) and is likely to be one of several competitive materials for the next generation of the lithium batteries.

"High-voltage" spinels having the general formulation $LiM_xMn_{2-x}O_{4-\delta}$, more specifically, those for which M is the element nickel, have electrochemical redox properties at extremely high potentials (beyond 4.5 V with respect to $Li^+/Li$).

Thus, in the first document which describes the behaviour of these materials, FR 2 738 673, it was demonstrated that spinel-structure compound $LiNi^{II}_{0.5}Mn^{IV}_{1.5}O_4$ is reversibly electrochemically active at a potential of approximately 4.7-4.75 V with respect to $Li^+/Li$. Its theoretical specific capacity is 146.7 mAh/g, and its theoretical energy density with respect to metal lithium is consequently around 700 Wh/kg (692.4 Wh/kg precisely for an average potential of 4.72 V). Similarly, $LiMn_2O_4$ ($Mn^{4+}/Mn^{3+}$) is reversibly electrochemically active at an average potential of approximately 4.1 V with respect to $Li^+/Li$ (148.2 mAh/g and 607.7 Wh/kg, in theory).

By way of comparison, the compound $LiCoO_2$ has a maximum practical mass energy density of 540 Wh/kg of active material.

Moreover, in the light of extensive work carried out on spinel $LiMn_2O_4$, it is well-known that this positive electrode compound offers very good electrochemical performance at high current densities because of its three-dimensional network structure (interconnection of channels in three dimensions in space). This leads one to predict good power behaviour for other materials having the same structure, especially those based on lithium and manganese such as $LiNi_xMn_{2-x}O_4$ ($0 \leq x \leq 0.5$) compounds for example.

The generic material "$LiNi_{0.5}Mn_{1.5}O_4$" which currently appears to offer the most attractive electrochemical performance in fact has a substantially different composition in which part of the manganese is in the +3 oxidation state due to the presence of a cation vacancy and/or the presence of a small quantity of a $Li_xNi_{1-x}O$ type impurity which appears during synthesis.

In fact, it is demonstrated in the article by J. H. Kim et al. [J. H; Kim, S. T. Myung, C. S. Yoon, S. G. Kang and Y. K. Sun, Chem. Mater, 2004, 16, 906-914: Comparative Study of $LiNi_{0.5}Mn_{1.5}O_{4-\delta}$ and $LiNi_{0.5}Mn_{1.5}O_4$ Cathodes Having Two Crystallographic Structures: Fd-3m and $P4_332$] that the electrochemical behaviour of the pure stoichiometric compound $LiNi_{0.5}Mn_{1.5}O_4$, in which the Ni and Mn ions are ordered at two separate crystallographic sites (sites 4a and 12d of the space group $P4_332$ respectively) is less satisfactory than that of its disordered non-oxygen-stoichiometric equivalent (Ni and Mn occupy the same crystallographic site 16d of space group Fd-3m). The presence of $Mn^{3+}$ ions in the compound as a result of oxygen vacancies is therefore probably beneficial as far as electrochemical performance is concerned.

The reader should note that the term "electrochemical performance" covers several criteria which are not always obtained simultaneously for a given compound:

performance in terms of energy density (specific capacity and potential capacity);

performance in terms of power (ability to cater for high-density current); and performance in terms of stability (stable cycling capacity).

Current development of lithium batteries has revealed the need to identify new compounds which can be used as a positive electrode material and which have optimal electrochemical properties as defined above.

SUMMARY OF THE INVENTION

In the context of the invention, the Applicant has obtained spinel structure compounds of the mixed oxide type based on nickel, manganese and lithium having a new formulation and morphology as well as the sought-after properties.

The present invention relates to a spinel structure compound having the formula $Li_yNi_{0.5-x}Mn_{1.5+x}O_{4-\delta}$ where:

$0.9 < y \leq 1.1$;

$0 < x \leq 0.1$;

$\delta > 0$;

and lattice parameters from 8.167 to 8.190 Å, preferably from 8.179 to 8.183 Å.

The invention is based on the Applicant's discovery that substituting manganese for a small quantity of nickel provides an alternative which makes it possible to obtain lithium-based high-voltage spinels with a portion of manganese in oxidation state +3 which have improved electrochemical performance.

From a theoretical point of view, in these compounds the $Ni^{4+}/Ni^{3+}$, $Ni^{3+}/Ni^{2+}$ and $Mn^{4+}/Mn^{3+}$ redox pairs are reversibly electrochemically active. It should be noted that it is advantageous to have compounds which work with the $Ni^{4+}/Ni^{2+}$ pair because they allow insertion/extraction of two moles of lithium ions per mole of nickel (electrochemical reaction which takes place at 4.7 V with respect to $Li^+/Li$).

This characteristic makes it possible to produce high-capacity, high energy-density batteries, even if the Mn/Ni molar ratio is less than 3:1 as in the case of $LiNi_{0.5}Mn_{1.5}O_4$. After all, it is intuitive that an excessively high ratio should be avoided.

In practice, the Applicant has demonstrated that materials which strike an optimum balance between practical mass energy density (high potential capacity and practical capacity) and thermal cycling (minimal capacity loss per cycle) have the formula $Li_yNi_{0.5-x}Mn_{1.5+x}O_{4-\delta}$.

In this formula:
y is preferably substantially equal to 1;
x is preferably substantially equal to 0.1;
One preferred compound according to the invention therefore has the formula $LiNi_{0.4}Mn_{1.6}O_{4-\delta}$.

$\delta$ corresponds to a slight oxygen deficiency which is classically caused by the generally high synthesis temperature. This deficit is also controlled by the cooling conditions described as part of the present invention. This value is preferably close to 0. The value 0 is, however, excluded.

Another essential characteristic of these compounds is their lattice parameter which is 8.167 (x=0 and $\delta$=0) to 8.190 Å(x=0.1) and preferably 8.179 to 8.183 Å.

The claimed compounds differ from those according to the prior art in terms of their definition and their advantageous properties in the context of the invention. When tested in lithium batteries, the compounds according to the invention have improved properties in terms of:

their stability of specific capacity: 130 mAh/g in a C/5 regime with zero loss per cycle over more than 100 cycles and a very small loss per cycle beyond this number of cycles; and energy density: >600 Wh/kg.

Document JP-A-8 217452 deals with a spinel structure material having the formula $LiM_xMn_{2-x}O_4$ in which x ranges from 0 to 0.5 inclusive and M is Co, Ni, Fe or Cr, but with a lattice parameter less than 8.24 Å. This material has good cycling properties, but with no particular specification, because of the use of a manganese oxide $MnO_2$ having a specific surface of 150 to 500 m²/g. This patent application refers implicitly to the potential range 3.5-4.5 V with respect to $Li^+/Li$, not beyond this and, because of this, does not take into account oxidation-reduction of element M (Co, Ni, Cr, Fe), usually between 4.5 et 5.0 with respect to $Li^+/Li$.

In addition, the article by K. Takahashi et al [Koh Takahashi, Motoharu Saitoh, Mitsuru Sano, Miho Fujita, and Koichi Kifune, *Journal of The Electrochemical Society*, 151, A173-A177 (2004)] entitled "Electrochemical and Structural Properties of a 4.7 V-Class $LiNi_{0.5}Mn_{1.5}O_4$ Positive Electrode Material Prepared with a Self-Reaction Method", mentions the existence of the $LiNi_{0.4}Mn_{1.6}O_4$ compound, but makes no specification regarding the lattice parameter. In addition, no electrochemical properties are highlighted. In particular, the specific capacity of this compound depending on the number of cycles performed is mentioned, but cycling takes place in the potential window 4.3-4.9 V with respect to $Li^+/Li$, thus excluding the $Mn^{4+}/Mn^{3+}$ redox pair. Under these conditions, from the time of the first cycle the specific capacity is less than 110 mAh/g and therefore relatively unfavourable.

In the context of the invention, it is, moreover, desirable for the compound according to the invention to have a clearly defined morphology, namely a particle size in excess of 1 micron and less than 20μ with a unique mode around 10 μm and a specific surface of the order of 1 m²/g (+/−0.5 m²/g).

According to another aspect, the invention also relates to a method of preparing such a material, deficient in oxygen and containing a small quantity of $Mn^{3+}$ ions (generally with a $Li_xNi_{1-x}O$ type impurity which is jointly present with the material).

It became apparent that complete mastery of the synthesis parameters, especially treatment temperature and treatment time, as well as the type of cooling used, was necessary in order to obtain the material according to the invention.

The invention therefore relates to a method of preparing said compounds, the essential stages of which are as follows:

mix carbonated precursors, preferably lithium, nickel and manganese carbonates, under stoichiometric conditions, possibly in the presence of a 1 to 5 mol percent excess of lithium;

subject this homogeneous mixture to a first heat treatment at a temperature of 500 to 700° C.;

subject said mixture to one or more annealing stages at a temperature of 700 to 950° C., preferably above 800° C., followed by cooling in a medium containing oxygen.

During the first stage, the precursors are intimately mixed by mechanical crushing in a liquid medium for 20 hours, in hexane for example, then the solvent is evaporated in order to produce a perfectly homogeneous powder.

In the second stage, heat treatment at around 600° C. must be performed in order to ensure the lithium is well incorporated into the mixed Ni and Mn oxide. This heating makes it possible to decarbonate and form the sought-after product.

The second heat treatment, generally at a temperature above 800° C., must be performed in order to cause loss of oxygen while creating the desired morphology.

Finally, cooling appropriate to the previous treatment is carried out in a medium containing oxygen so as to enable partial return of oxygen. A certain quantity of manganese (III) corresponding to a lattice parameter of around 8.176 Å, for $LiNi_{0.5}Mn_{1.5}O_4$ for example, must remain.

Depending on the synthesis process used, a stage to disperse the particles in an aqueous solution and/or chemically modify the surface of the oxide can further improve the electrochemical properties of the electrode material.

In certain cases, the obtained particles are found to have two modes of distribution: one typically around 10 μm and another around 100 μm. In fact, the latter corresponds to agglomeration of the smaller sized particles. Treatment of the powder in an aqueous solution can then be carried out. This treatment is performed for several minutes using an ultrasonic stirrer or 48 hours using a magnetic stirrer for example. Drying at a temperature equal to or less than 400° C. (in order to avoid re-agglomeration), produces a powder which contains only particles having a mode around 10 μm.

The main effect of this dispersion is to allow greater penetration of the electrolyte between the particles of active material, thus substantially increasing the current response (a higher capacity for a given cycling regime).

Alternatively, the non-dispersed powder can be screened in order to collect particles having a particle size less than 20 μm.

In addition, because of the presence of nickel (an element with catalytic properties) and, above all, the higher operating potential (in excess of 4.5 V with respect to $Li^+/Li$), which is outside the thermodynamic stability window of solvents used in conventional electrolytes, modifying the surface of the powder and its physicochemical properties can be beneficial in order to improve extended cycling performance even more (longer service life). In fact, although cycling stability is above all linked to structural stability, it also depends on the contact area with the electrolyte (increased particle size, reduction in specific surface). The morphology and size of the grains obtained using the synthesis process make it partly possible to limit reactivity vis-à-vis the electrolyte at high potential and thus also help limit capacity loss during cycling, whether at ambient temperature or 55° C., when reactivity is usually amplified.

In practice, the surface treatment involves using an aqueous solution containing phosphate ions ($LiH_2PO_4$ or $(NH_4)_2HPO_4$ for example), of variable concentration, in which the mixed oxide is placed. This mixture is magnetically stirred for a period ranging from several minutes to tens of days, preferably 48 hours. Centrifuging is performed after the specified period, followed by repeated rinsing in ultra-pure water and ethanol followed by oven drying at 60° C. Finally, heat treatment at 350° C. (+/−25° C.) is performed for a period varying from 2 to 5 hours.

Because of the advantageous electrochemical properties of the claimed compound, the invention also relates to electrodes and to batteries which have, on their negative electrode, either lithium metal or a lithium insertion material (lithium-ion type) comprising, as its active material, said compound and, more elaborately, batteries consisting of series-connected cells.

The electrodes, deposited on metal foil acting as a current collector preferably consist of a dispersion of the active material with an electronically conductive additive (for instance carbon) and/or an organic binder (for instance polyether, polyester, methyl methacrylate-based polymer, acrylonitrile, vinylidene fluoride) which gives good conductivity and satisfactory mechanical strength. A mechanical separator between the two electrodes is imbibed with electrolyte (ion conductor). The latter generally consists of a salt, the cation of which is at least partly a lithium ion ($LiClO_4$, $LiAsF_6$, $LiPF_6$, $LiBF_4$, $LiCH_3SO_3$, etc.) and a polar aprotic solvent (ethylene or propylene carbonate, dimethyl carbonate, diethyl carbonate, methylethylcarbonate, etc.).

DESCRIPTIONS OF THE PREFERRED EMBODIMENTS

The invention and its resulting advantages will be made more readily apparent by the following descriptions of the preferred embodiments, reference being made to the accompanying drawings. These examples are, however, not limitative under any circumstances.

FIG. 1 is a graph showing an x-ray diffraction diagram ($\lambda.CuK\alpha$) for a compound having the formula $LiNi_{0.4}Mn_{1.6}O_{4-\delta}$. The vertical lines correspond to the calculated Bragg positions for the space group Fd-3m with a lattice parameter of 8.179 Å.

FIG. 2 is a graph showing an intensiostatic cycling curve (first charge/discharge cycle) on which the potential with respect to the $Li^+/Li$ pair as a function of the composition of the active material of the positive electrode is plotted ($LiNi_{0.4}Mn_{1.6}O_{4-\delta}$, with a lattice parameter of 8.179 Å).

FIG. 3 is a graph showing changes in discharge capacity (expressed in mAh/g) as a function of the number of cycles for three materials comprising $LiNi_{0.5-x}Mn_{1.5+x}O_{4-\delta}$ (x=0; 0.05 and 0.10) at 20° C. in a C/5 regime between 3.5 and 5 V with respect to $Li^+/Li$.

Figure 4:
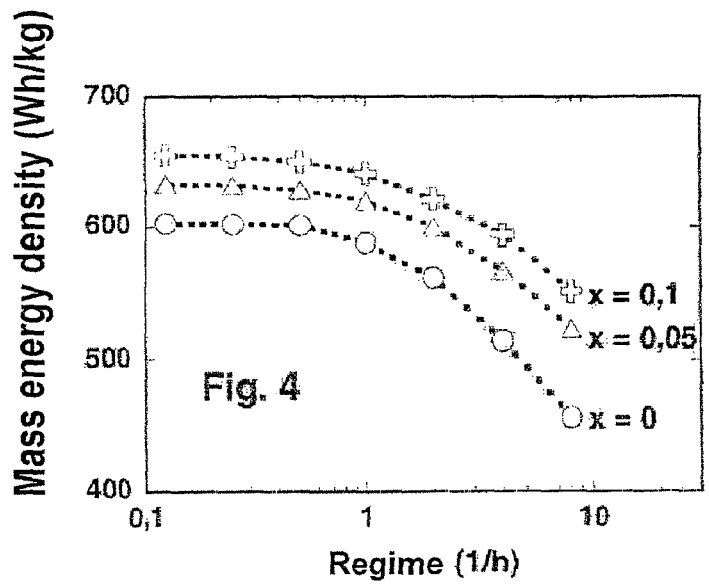

FIG. 4 is a graph showing the mass energy density (discharge) (product of potential and specific capacity) expressed in Wh/kg of active material as a function of regime (current density) for the three materials stated in FIG. 3.

Figure 5:
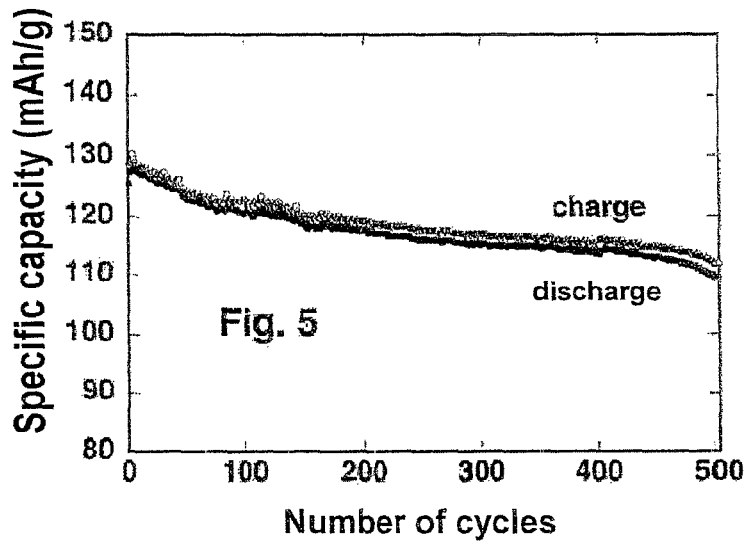

FIG. 5 is a graph showing changes in discharge and charge capacity (expressed in mAh/g) as a function of the number of cycles for a material comprising $LiNi_{0.4}Mn_{1.6}O_{4-\delta}$ with a lattice parameter of 8.179 Å at 20° C. in a C regime between 3.5 and 5 V with respect to $Li^+/Li$.

Figure 6:
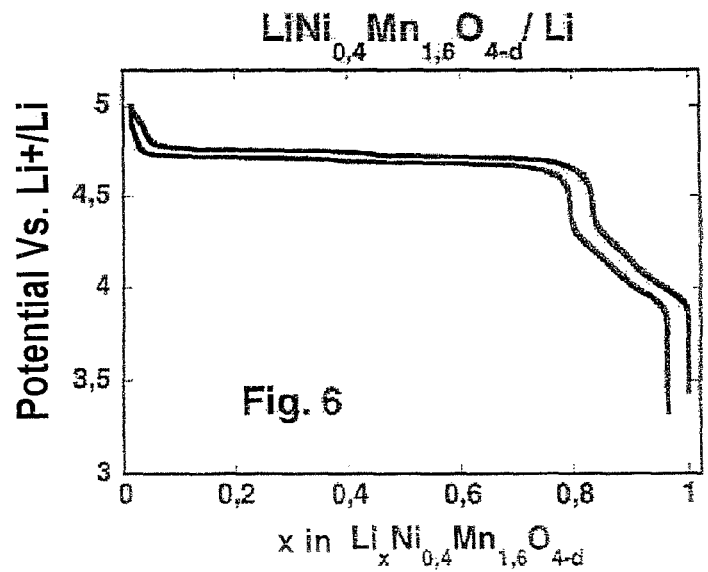

FIG. 6 is a graph showing an intentiostatic cycling curve (tenth charge/discharge cycle) on which the potential with respect to the $Li^+/Li$ pair as a function of the composition of the active material of the positive electrode is plotted ($LiNi_{0.4}Mn_{1.6}O_{4-\delta}$ with a lattice parameter of 8.179 Å).

FIG. 7 is a graph showing changes in discharge capacity (expressed in mAh/g) as a function of the number of cycles for a material comprising $LiNi_{0.4}Mn_{1.6}O_{4-\delta}$ and a lattice parameter of 8.179 Å at 20° C. in a C/5 regime between 3.5 and 5 V with respect to $Li^+/Li$. This material is treated in different ways using, respectively, the basic process according to the invention (so-called "normal" method), after being subjected to a dispersion stage (so-called "dispersed" method) and after surface treatment (so-called "coated" method).

EXAMPLE 1

An intimate mixture of carbonate-based precursors (8.168 g of nickel carbonate, 6.261 g of lithium carbonate and 30.641 g of manganese carbonate) under stoichiometric conditions with a 3 mol percent excess of Li is obtained by grinding in a Retsch-type planetary ball mill in a 250 ml bowl containing 13 to 15 balls each having a diameter of 20 mm and weighing 10.8 g for 20 hours (4 times 5 hours) at 500 rpm in the presence of hexane (powder is submerged). The mixture is dried overnight at 55° C. and subsequently treated at 600° C. (10 hours) then 900° C. (15 hours), followed by cooling to ambient temperature at a rate of 1° per minute. The compound thus obtained has the characteristics according to the invention and a lattice parameter of 8.179 Å.

FIGS. 1 to 7 illustrate the properties of the sample obtained in accordance with this example 1.

EXAMPLE 2

An intimate mixture of carbonate-based precursors (8.168 g of nickel carbonate, 6.261 g of lithium carbonate and 30.641 g of manganese carbonate) under stoichiometric conditions with a 3 mot percent excess of Li is obtained by grinding in a Retsch-type planetary ball mill in a 250 ml bowl containing 13 to 15 balls each having a diameter of 20 mm and weighing 10.8 g for 20 hours (4 times 5 hours) at 500 rpm in the presence of hexane (powder is submerged). The mixture is dried overnight at 55° C. and subsequently treated at 600° C. (10 hours) then 920° C. (15 hours), followed by cooling to ambient temperature at a rate of 5° per minute. The compound thus obtained has the characteristics according to the invention and a lattice parameter of 8.1827 Å.

EXAMPLE 3

An intimate mixture of nitrate-based precursors (22.076 g of manganese nitrate, 3.895 g of lithium nitrate and 6.491 g of nickel carbonate) under stoichiometric conditions with a 3 mol percent excess of Li and 2 g of water is obtained by heat treatment at 600° C. (temperature increase 0.1° per minute from 30° C. to 300° C., then hold for 3 hours at 300° C., then temperature increase at 0.2° per minute from 300 to 600° C., then hold for 15 hours at 600° C. followed by cooling to ambient temperature at a rate of 5° per minute) and then heat treatment at 900° C. (24 hours) followed by cooling to ambient temperature at a rate of 3° per minute. The compound thus obtained has the characteristics according to the invention and a lattice parameter of 8.1807 Å.

DISPERSION EXAMPLE 1

A stage to disperse the particles of a sample prepared using the procedure in Example 1 in an aqueous solution, the particles having two modes of distribution: one around 10 μm and another around 100 μm. The latter corresponds to agglomeration of the smaller sized particles. Treatment of the powder in an aqueous solution is then carried out. This treatment takes place at ambient temperature with ultrasonic stirring and lasts 10 minutes. Drying at a temperature equal to or less than 400° C. (in order to avoid re-agglomeration), produces a powder which contains only particles having a mode around 10 μm. Note (FIG. 7) that this dispersion can allow better impregnation of the electrolyte during the electrochemical test, as described in Example 4. The effect of this substantially increases the current response (a higher capacity for a given cycling regime). The compound thus obtained still has the characteristics according to the invention.

DISPERSION EXAMPLE 2

A stage to disperse the particles of a sample prepared using the procedure in Example 1 in an aqueous solution, the particles having two modes of distribution: one around 10 μm and another around 100 μm. Treatment of the powder in an aqueous solution is then carried out. This treatment takes place at ambient temperature with magnetic stirring in a beaker and lasts 48 hours. Drying at a temperature equal to or less than 400° C. (in order to avoid re-agglomeration), produces a powder which contains only particles having a mode around 10 μm. The compound thus obtained has the characteristics according to the invention.

DISPERSION EXAMPLE 3

A stage to disperse the particles of a sample prepared using the procedure in Example 1 by successive mechanical screening, the particles having two modes of distribution: one around 10 μm and another around 100 μm. Particles having a size smaller than 20 μm are collected. The compound thus obtained has the characteristics according to the invention.

SURFACE MODIFICATION EXAMPLE

Ten grams of $LiNi_{0.4}Mn_{1.6}O_{4-\delta}$ is subjected to a stage to modify the chemical nature of the surface of the material prepared using the procedure in Example 1. The material is immersed in 250 ml of an aqueous solution containing 0.18 mol/l of $LiH_2PO_4$ and magnetically stirred for 48 hours at ambient temperature. After centrifuging and successive rinses in water and then ethanol, it is dried at 55° C. for 12 hours. Finally, heat treatment is carried out for 3 hours at 350° C. The compound thus obtained also has the characteristics according to the invention. In addition, improved cycling stability has been observed (increased battery service life) during the electrochemical test as described in Example 4 (FIG. 7: "Coated" curve).

EXAMPLE 4

A button cell type battery having a negative electrode comprising:
   a lithium disc (diameter 16 mm, thickness 130 μm) deposited on a nickel disc which acts as a current collector,
   a positive electrode consisting of a 14 mm diameter disc taken from a 50 μm thick composite film comprising the material according to the invention prepared using the procedure in dispersion Example 1 (80% by mass), carbon black (10% by mass) as a conductive material and polyvinylidene hexafluoride (10% by mass) as a binder, all of these being deposited on a current collector made of aluminium (20 μm thick foil),
   a separator imbibed with liquid electrolyte based on $LiPF_6$ salt (1 mol/L) in solution in a mixture of propylene carbonate, ethylene carbonate and dimethyl carbonate.

At 20° C. in a C/5 regime, this system produces a capacity of 140 mAh/g, i.e. more than 640 Wh/kg of active material. At this same temperature in a C regime, this system produces a relatively stable capacity (130 to 110 mAh/g of active material) over 500 cycles, equivalent to a loss per cycle of less than 0.025%

EXAMPLE 5

A button cell type battery having a negative electrode comprising:
   a lithium disc (diameter 16 mm, thickness 130 μm) deposited on a nickel disc which acts as a current collector,
   a positive electrode consisting of a 14 mm diameter disc taken from a 50 μm thick composite film comprising the material according to the invention prepared using the procedure in the surface modification Example (80% by mass), carbon black (10% by mass) as a binder, all of these being deposited on a current collector made of aluminium (20 μm thick foil),
   a separator imbibed with liquid electrolyte based on $LiPF_6$ salt (1 mol/L) in solution in a mixture of propylene carbonate, ethylene carbonate and dimethyl carbonate.

At 20° C. in a C/5 regime, this system produces a capacity in excess of 130 mAh/g of active material with no loss of performance over 100 cycles.

EXAMPLE 6

A 2-Ah Li-ion battery (prototype wound with double-sided electrodes) comprising thick electrodes made of the material according to the invention (positive electrode) and graphite (negative electrode) enclosed in a flexible package. Such a battery is capable of producing approximately 240 Wh/kg (overall energy density of battery; directly comparable to 160-180 Wh/kg of commercial $LiCoO_2$/graphite batteries) under practical conditions of use (cycling regime equivalent to C/5 for example).

The synthesis methods described above were adopted in order to synthesise several samples having the composition $Li_yNi_{0.5-x}Mn_{1.5+x}O_{4-\delta}$.

FIG. 1 shows the x-ray diffraction diagram for a $LiNi_{0.4}Mn_{1.6}O_{4-\delta}$ d sample having a lattice parameter of 8.179 Å, obtained, as stated, using the method described in relation to Example 1.

$LiNi_{0.4}Mn_{1.6}O_{4-\delta}$ with a lattice parameter of 8.179 Å has a theoretical specific capacity of 147 mAh/g at an average potential of 4.6 V with respect to $Li^+/Li$, i.e. a theoretical density of 675.6 Wh/g of active material. When the lithium is extracted (charging the battery) from the initial compound, the $Mn^{3+}$ ions are oxidised to $Mn^{4+}$ (≈20% of capacity) and the $Ni^{2+}$ ions are oxidised to $Ni^{4+}$ (≈80% of capacity), as FIG. 2 shows.

The specific capacity as a function of the number of cycles completed for the three compounds having the formulation $Li_yNi_{0.5-x}Mn_{1.5+x}O_{4-\delta}$ is plotted in FIG. 3. It is immediately obvious that $LiNiO_4Mn_{1.6}O_{4-\delta}$ (i.e. x=0.1) offers much better cycling performance (higher capacity for a given number of cycles completed) than $LiNi_{0.45}Mn_{1.55}O_{4-\delta}$ (i.e. x=0.05). Similarly, $LiNi_{0.4}Mn_{1.6}O_{4-\delta}$ offers better power performance (FIG. 4).

It should be noted that the variation in mass energy density is chiefly due to the increase in average potential with high current densities. In contrast, specific capacity is relatively unaffected by an increase in current density. For example, specific discharge capacity is close to 143 mAh/g in C/8 regime (>97% of theoretical value) and, after C/8 charging, reaches 133 mAh/g for 8 C (>90% of theoretical value). The Faraday efficiency, equivalent to the ratio of charge capacity to discharge capacity, is also very high (>97% in C/8, >99% in C, for instance), as FIG. 5 also shows. Polarisation (or internal resistance) is weak during the first charge/discharge cycle, reduces doing the next 2-3 cycles and remains very weak until the end of the battery's service life (i.e. after several hundred or several thousand cycles). For example, in C/5 regime, the potential difference between the charge curve and the discharge curve is less than 40 mV during the 10th cycle of the $LiNi_{0.4}Mn_{1.6}O_{4-\delta}$/Li system (FIG. 6).

FIG. 7 shows that a stage to disperse the particles in aqueous solution or to chemically modify the surface of the oxide improves the electrochemical properties of the electrode material according to the invention further still.

The invention claimed is:

1. A spinel structure compound of the formula $LiNi_{0.4}Mn_{1.6}O_{4-\delta}$, wherein
   $\delta > 0$
   and having a lattice parameter of from 8.179 to 8.183 Å.

2. A compound as claimed in claim 1, having a uniform particle size in excess of 1 μm.

3. A compound as claimed in claim 1, having a specific surface of 0.5 to 1.5 $m^2$/g.

4. A method of preparing a compound as claimed in claim 1, the method comprising:
   mixing carbonated precursors under stoichiometric conditions to produce a mixture;
   subjecting the mixture to a first heat treatment at a temperature of from 500 to 700° C.; and then
   subjecting the mixture to one or more annealing treatments at a temperature of from 700 to 950° C., followed by cooling in a medium containing oxygen.

5. A method of preparing a compound as claimed in claim 4, wherein particles are obtained, and the particles are dispersed by screening, or by treatment in an aqueous solution followed by drying, or by both screening and treatment in an aqueous solution followed by drying.

6. A method of preparing a compound as claimed in claim 4, wherein the chemical nature of the surface of the compound is modified by treatment with phosphate ions.

7. An electrode comprising the compound as claimed in claim 1 as an electrochemically active material.

8. An electrode as claimed in claim 7, wherein the compound is in dispersed form and mixed with an electronically conductive additive, an organic binder, or an electronically conductive additive and an organic binder.

9. A battery comprising at least a first electrode as claimed in claim 7, and a second electrode made of a material capable of receiving lithium ions, the first and second electrodes being separated by a separator imbibed with electrolyte.

10. A set of batteries comprising at least one battery as claimed in claim 9.

11. The compound as claimed in claim 1, in the form of particles having a uniform particle size of about 10 μm.

12. The method of claim 4, wherein the carbonated precursors comprise lithium, nickel and manganese carbonates.

13. The method of claim 4, wherein the first heat treatment is at a temperature of from 600 to 700° C.

14. The method of claim 4, wherein the one or more annealing treatments is at a temperature of 800° C. to 950° C.

15. The method of claim 14, wherein the one or more annealing treatments is at a temperature of 900° C. to 950° C.

16. The method of claim 14, wherein the first heat treatment is at a temperature of 600 to 700° C.

17. The method of claim 15, wherein the first heat treatment is at a temperature of 600 to 700° C.

18. The method of claim 4, wherein the mixing is carried out in the presence of a 1 to 5 mol percent excess of lithium.

* * * * *